(12) United States Patent
Bojarski et al.

(10) Patent No.: US 11,408,760 B2
(45) Date of Patent: Aug. 9, 2022

(54) DEVICE FOR DETECTING MEDIA

(71) Applicant: AB Elektronik Sachsen GmbH, Klingenberg (DE)

(72) Inventors: Aldo Bojarski, Höckendorf (DE); Ralph Adner, Dresden (DE); Lutz Uhlemann, Colmnitz (DE); Werner Fichte, Klingenberg (DE)

(73) Assignee: KYOCERA AVX Components (Dresden) GmbH, Klingenberg (DE)

( * ) Notice: Subject to any disclaimer, the term of this patent is extended or adjusted under 35 U.S.C. 154(b) by 321 days.

(21) Appl. No.: 16/615,162

(22) PCT Filed: Jun. 18, 2018

(86) PCT No.: PCT/EP2018/066062
§ 371 (c)(1),
(2) Date: Nov. 20, 2019

(87) PCT Pub. No.: WO2018/234213
PCT Pub. Date: Dec. 27, 2018

(65) Prior Publication Data
US 2020/0173833 A1    Jun. 4, 2020

(30) Foreign Application Priority Data
Jun. 19, 2017 (DE) .................... 10 2017 210 152.0

(51) Int. Cl.
*G01F 23/24* (2006.01)
*G01F 1/69* (2006.01)
(Continued)

(52) U.S. Cl.
CPC .............. *G01F 23/247* (2013.01); *G01F 1/69* (2013.01); *G01F 23/24* (2013.01); *G01F 23/246* (2013.01);
(Continued)

(58) Field of Classification Search
CPC .......... G01F 23/247; G01F 1/69; G01F 23/24; G01F 23/246; G01N 15/06; G01N 25/18; G01K 7/16
See application file for complete search history.

(56) References Cited

U.S. PATENT DOCUMENTS 3,878,541 A    4/1975    Dodson, III
4,125,093 A    11/1978   Platzer, Jr.
(Continued)

FOREIGN PATENT DOCUMENTS

DE    2536821    3/1977
DE    2950762    7/1980
(Continued)

OTHER PUBLICATIONS

PCT International Search Report and Written Opinion for corresponding PCT Application No. PCT/EP2012/066062, dated Oct. 8, 2018, 15 pages.

*Primary Examiner* — Benjamin R Schmitt
(74) *Attorney, Agent, or Firm* — Dority & Manning, P.A.

(57) ABSTRACT

The invention relates to devices for detecting media.
These are distinguished, in particular, by the fact that simply the medium can be detected and/or properties of the or a medium can be determined or monitored.
For this purpose, a heating sensor comprising a heating device and at least one p-n junction operated in the forward direction and a reference sensor comprising at least one p-n junction operated in the forward direction are spaced apart from one another. The heating device and the p-n junctions are connected to a control device, which is a control device ascertaining the presence and/or at least one property of the medium from the thermal properties of the medium.

16 Claims, 2 Drawing Sheets

(51) Int. Cl.
  *G01M 3/26* (2006.01)
  *G01N 15/06* (2006.01)
  *G01K 7/16* (2006.01)
  *G01N 25/18* (2006.01)

(52) U.S. Cl.
  CPC .............. *G01M 3/26* (2013.01); *G01N 15/06* (2013.01); *G01K 7/16* (2013.01); *G01N 25/18* (2013.01)

(56) References Cited

U.S. PATENT DOCUMENTS

| | | |
|---|---|---|
| 4,591,839 A | 5/1986 | Charboneau et al. |
| 4,677,850 A | 7/1987 | Miura et al. |
| 4,859,076 A | 8/1989 | Twerdochlib |
| 4,888,987 A | 12/1989 | Zhang |
| 8,763,455 B1 | 7/2014 | Chang |
| 2006/0144140 A1 | 7/2006 | Hache |
| 2008/0041152 A1 | 2/2008 | Schoenberg |
| 2009/0071243 A1 | 3/2009 | Camp |
| 2014/0260520 A1 | 9/2014 | Schoenberg |
| 2015/0130531 A1 | 5/2015 | Tadinada et al. |

FOREIGN PATENT DOCUMENTS

| | | |
|---|---|---|
| DE | 4436395 | 2/1996 |
| DE | 19741892 | 4/1999 |
| DE | 20 2004 017711 | 1/2005 |
| DE | 102008012503 | 9/2009 |
| FR | 1223248 | 6/1960 |
| GB | 2138566 | 10/1984 |
| GB | 2222705 | 3/1990 |

DEVICE FOR DETECTING MEDIA

FIELD

The present disclosure relates to devices for detecting media.

BACKGROUND

A device for detecting a medium is known, inter alia, from publication DE 10 2007 003 860 A1, as a sensor for detecting a liquid state. The sensor comprises a sensor element as an electric resistor between ceramic layers, which is a heating element and also changes its resistance according to the temperature of the sensor element and, therefore, of the medium on the sensor element.

Publication DE 197 41 892 A1 describes a method and a device for determining the quantity and quality of a liquid. A temperature-dependent resistor element is utilized for ascertaining a fill level. The resistor element is heated via the supply of current and, at the same time, the voltage across the resistor element is measured, wherein at least two voltage values are utilized in order to ascertain the fill level.

Publication DE 44 36 395 C1 describes a fill level sensor comprising multiple voltage dividers, which are distributed over the area of the fill levels to be measured. If the fill level exceeds or falls below a voltage divider, each of which comprises a negative temperature coefficient thermistor and a positive temperature coefficient thermistor, an unambiguous jump of the output signal takes place. The thermistors are coupled to the particular medium, i.e., fuel and air in this case.

The sensitivity of these approaches is limited, for instance, by the particular material of the resistor.

Publication DE 10 2008 012 503 A1 discloses a water sensor comprising a solenoid valve. This relates to a component for monitoring the water level in a fuel filter, in particular a diesel fuel filter. The basis thereof is a fill level tube in connection with a water collection container of the diesel fuel filter. Measuring poles, which deliver a signal if the water level reaches the measuring poles, are provided at least one given height. Therefore, only electrically conductive substances can be detected.

Publication GB 2 222 705 A describes a reduced pressure enclosure for determining the air flow from devices having a reduced pressure, which comprises a sensor for detecting the flow speed of air, which is connected to a control device. An anemometer arrangement comprising two adjacently arranged electronic components can be utilized for this purpose, wherein one of these components is mounted on a heating means. The two components are connected to a circuit for detecting the temperature difference of the components and, therefore, the speed of the air. A determination of a medium is not provided.

Publication DE 29 50 762 A1 discloses a device for detecting the presence of a free-flowing medium with the aid of a first temperature-dependent semiconductor device, which effectuates a heating of the device above the ambient temperature and which is immersed into the free-flowing medium, wherein its temperature drops. Moreover, a second temperature-dependent semiconductor device is provided, the temperature of which is lower than that of the first device. By detecting a change in the difference, the presence of the free-flowing substance can be inferred. Zener diodes operated in the reverse direction are utilized for this purpose.

Publication U.S. Pat. No. 4,677,850 A describes a semiconductor component for detecting a flow of a medium. In this case, a first semiconductor chip comprises a first temperature detector and a second semiconductor chip comprises a heating element and a second temperature detector, wherein the second semiconductor chip is arranged in the proximity of the first semiconductor chip. The semiconductor chips are arranged one after the other in the direction of flow of the medium. The semiconductor element is provided for detecting the air flow, in particular, of the intake air of an internal combustion engine.

Publication CN 1986 107 738 A discloses an element for performing detection, as a sensor comprising at least one p-n junction, wherein a large current is utilized for self-heating and a small current is utilized for detection. The p-n junction is utilized for heating as well as for detecting the temperature, so that a thermal coupling is present in the element itself. This affects the detection, and so the sensitivity and, thereby, the measuring accuracy of the element is limited.

Publication EP 2 037 233 A1 describes a detector for determining the presence of a fluid. The detector comprises a probe including a thermistor and a temperature sensor for measuring the temperature of the thermistor. The presence or the identity of a fluid surrounding the probe is determined on the basis of the time component at which current is supplied to the thermistor in order to hold the thermistor essentially at a predetermined temperature. The sensitivity and the measuring accuracy are limited by the use of the thermistor and its temperature measurement.

SUMMARY

Aspects and advantages of embodiments of the present disclosure will be set forth in part in the following description, or may be learned from the description, or may be learned through practice of the embodiments.

One example aspect of the present disclosure is directed to a device for detecting media. The device includes a heating sensor. The heating sensor includes a heating device and at least one first p-n junction operated in a forward direction. The device includes a reference sensor. The reference sensor includes at least one second p-n junction operated in a forward direction. The heating sensor and the reference sensor are spaced apart from one another. The heating device and the first and second p-n junctions are connected to a control device. The control device is operable to ascertain a presence or at least one property of a medium based at least in part on one or more thermal properties of the medium.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

Figure 1:
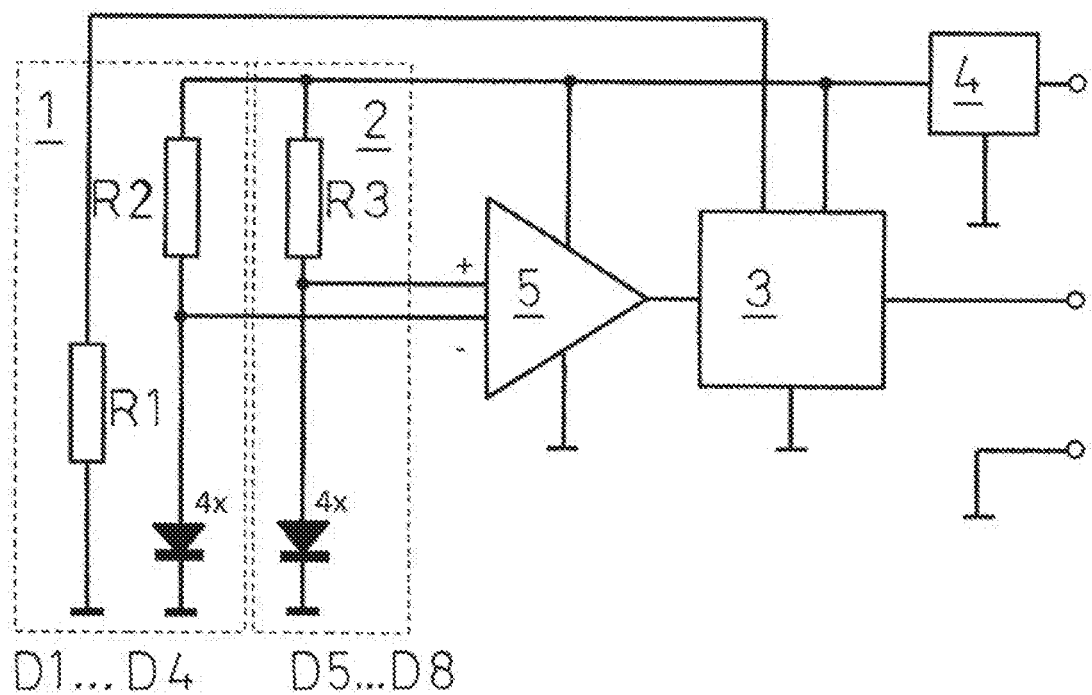
FIG. 1 shows a block diagram of a device for detecting media.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

A problem addressed by example aspects of the present disclosure is that of easily detecting a medium.

The devices for detecting a medium are distinguished, in particular, by the fact that simply the medium can be detected and/or properties of the or a medium can be determined or monitored.

For this purpose, a heating sensor comprising a heating device and at least one p-n junction operated in the forward direction and a reference sensor comprising at least one p-n junction operated in the forward direction are spaced apart from one another. The heating device and the p-n junctions are connected to a control device, which is a control device ascertaining the presence and/or at least one property of the medium from the thermal properties of the medium.

The device for detecting a medium is based on a thermal measuring principle, wherein the thermal properties of the medium are utilized. This takes place statically or via a chronological sequence with the aid of the ascertainment of the temperature difference between the heated heating sensor and the unheated reference sensor.

The p-n junctions are operated in the forward direction, and the forward voltage and, therefore, the conducting-state voltage, is measured. This can take place via the supply of a constant current with the aid of constant current sources. The forward voltage is temperature-dependent, so that different voltage values set in when temperature changes occur and depending on the corresponding medium. The voltage values can be assigned to the particular medium or to the property of the medium with the aid of the control device. The measurement advantageously takes place, in this case, with the aid of the heating sensor and the reference sensor in relation to one another, so that ambient temperatures and, in particular, the resultant temperatures of the medium surrounding the device are not incorporated into the measurement result.

In an embodiment of the present disclosure, the control device is a control device ascertaining the difference of the forward voltages of the p-n junctions between the medium heated by the heating sensor and the unheated medium at the reference sensor.

In an embodiment of the present disclosure, heating device is at least one resistor and/or a p-n junction in each case. In the case of both, the electrical energy from the applied voltage and from the flowing electric current is converted into thermal energy. Advantageously, a so-called and known surface mount device component can be utilized for this purpose.

In an embodiment of the present disclosure, the p-n junction is advantageously a diode or the base-emitter path of a transistor.

In an embodiment of the present disclosure, the p-n junctions are each connected to an input of a differential amplifier and the output of the differential amplifier is connected to the control device. For this purpose, the control device can advantageously be a data processing system, in particular a microcontroller.

In an embodiment of the present disclosure, the heating sensor and the reference sensor comprise multiple p-n junctions connected in series and spaced apart from one another. The voltage drops at the series-connected p-n junctions are cumulative, so that different fill levels can be assigned via the positions of the p-n junctions.

In an embodiment of the present disclosure, the p-n junctions are connected to an electrical network via a DC-DC converter, wherein the DC-DC converter is or comprises at least one constant current source.

In an embodiment of the present disclosure, the heating sensor and the reference sensor are advantageously designed to be finger-like.

In an embodiment of the present disclosure, the component comprising the p-n junction, and the heating device, as the heating sensor, are located on a first leg and the component comprising the p-n junction, as the reference sensor, is located on the second leg of a component carrier designed in a U-shape, at least in some areas. The legs are spaced apart in a finger-like manner and are arranged in parallel to one another and, during use of the device, simply extend into the medium. For this purpose, the fingers can advantageously be the components of a circuit board, on which the components of the device are arranged and are connected to one another via strip conductors.

In an embodiment of the present disclosure, at least the legs of the component carrier designed in a U-shape, including the particular components, are embedded in a plastic or are located in a housing.

In an embodiment of the present disclosure, the device for detecting media comprises, as a sensor for detecting the medium, a DC-DC converter in connection with a data processing system, in particular a microcontroller as the control device, a differential amplifier, the heating device, and the p-n junctions.

In an embodiment of the present disclosure, the device for detecting a medium is a device for detecting the fill level of the medium in a container.

In an embodiment of the present disclosure, the device for detecting a medium is a device for detecting the flow of the medium.

In an embodiment of the present disclosure, the device for detecting a medium is a device for detecting the state of aggregation of the medium.

In an embodiment of the present disclosure, the device for detecting a medium is a device for detecting the concentration of a substance as the medium in a binary system.

In an embodiment of the present disclosure, the device for detecting a medium is a device for detecting the oil level in a transmission.

The subject matter of the present disclosure is also the use of a device according to the invention for detecting a medium.

In order to implement the present disclosure, it can be advantageous to combine the above-described designs according to the invention, embodiments, and features of the claims with one another in any arrangement.

An exemplary embodiment of the present disclosure is basically represented in each of the drawings, and is described in greater detail below.

A device for detecting media is essentially composed of a heating sensor 1, a reference sensor 2, and a control device.

FIG. 1 shows a basic block diagram of a device for detecting media.

The heating sensor 1 comprises at least a first resistor R1, as a heating device, and p-n junctions operated in the forward direction. The p-n junctions are diodes D1 through D4 spaced apart from one another in a series circuit.

The reference sensor 2 comprises p-n junctions operated in the forward direction, wherein the p-n junctions are designed as diodes D5 through D8 spaced apart from one another and connected in series.

The anodes of the diodes D1 through D4 and the anodes of the diodes D5 through D8 are connected, via a resistor as the second resistor R2 and the third resistor R3, respectively, to a DC-DC converter 4, which is simultaneously a constant current source for the diodes D1 through D8 operated in the forward direction.

The connection of the second resistor R2 to the anode of the first diode D1 of the heating sensor 1 is connected to the inverting input of a differential amplifier 5. The connection of the third resistor R3 to the first diode D5 of the reference sensor 2 is connected to the non-inverting input of the differential amplifier 5. The values of the second resistor R2 and of the third resistor R3 are dimensioned in such a way that the voltage value at the non-inverting input of the differential amplifier 5 is greater than the voltage value at the inverting input of the differential amplifier 5.

The output of the differential amplifier 5 is connected to a data processing system, as a control device, wherein this is, in particular, a microcontroller 3. This, in turn, is connected to the resistor R1, as a heating resistor.

With the aid of the microcontroller 3, the medium and/or at least a property of the medium are/is ascertained from the temperature-dependent forward voltages resulting from the thermal properties of the medium.

The voltage supply of the device can take place via the DC-DC converter 4, which can convert the voltage of a power supply network.

Figure 2:
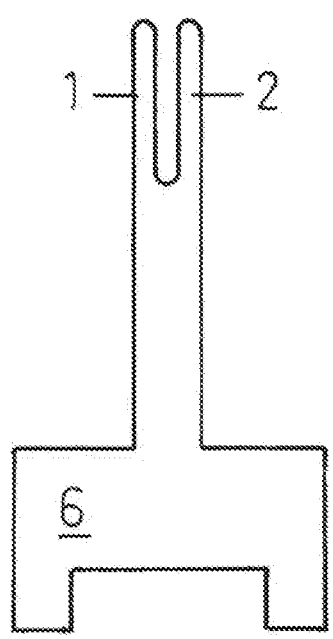
FIG. 2 shows a component carrier as a circuit board for a device for detecting media.

FIG. 2 shows a basic representation of a component carrier 6 as a circuit board for a device for detecting a medium.

At least one area of a component carrier 6, as the circuit board, is designed in a U-shape, wherein the legs for the heating sensor 1 and the reference sensor 2 are finger-like. The diodes D1 through D4 and first series-connected first resistors R1, as heating resistors for the heating sensor 1, are spaced apart on one leg of the U-shape and the diodes D5 through D8 for the reference sensor 2 are arranged on the other leg. The microcontroller 3, the differential amplifier 5, and the DC-DC converter 4, each as components, are arranged on an area of the center part. In addition, a protective circuit can be provided and can be arranged upstream from the device for detecting a medium.

Figure 3:
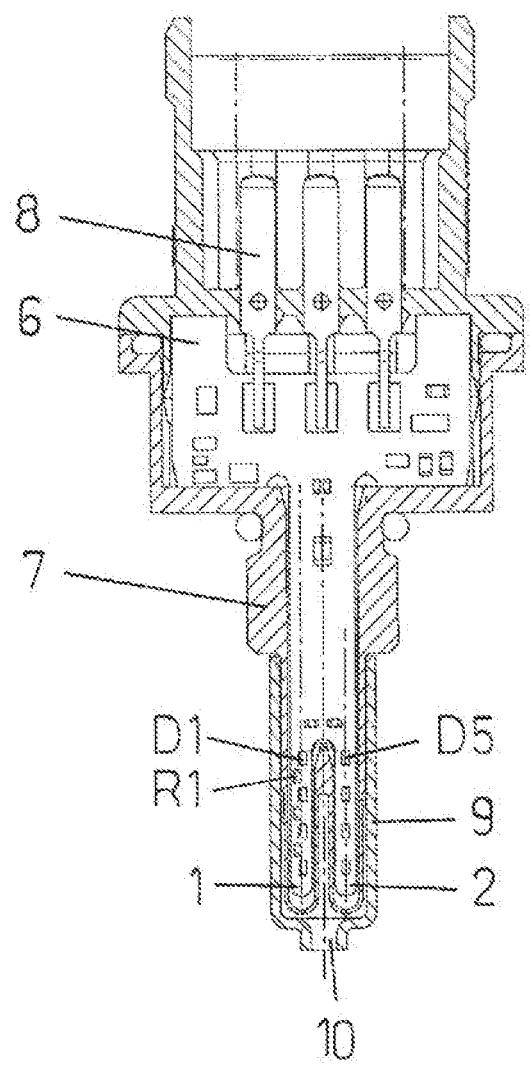
FIG. 3 shows a device for detecting media, in connection with a connector housing.

FIG. 3 shows a basic representation of a device for detecting a medium in connection with a connector housing.

The legs of the component carrier 6 designed in a U-shape, including the particular components, is located in a housing 7, which can be, for example, a connector housing. The plugs 8 are located on the component carrier 6. Moreover, a cap 9 including an opening can be slid onto the housing 7.

Therefore, a compact device for detecting a medium is implemented.

In embodiments, the device for detecting a medium can be
a device for detecting the fill level of the medium in a container,
a device for detecting the flow of the medium,
a device for detecting the state of aggregation of the medium,
a device for detecting the concentration of a substance, as the medium, in a binary system, or
a device for detecting the oil level in a transmission.

The fill level of a medium can be detected with respect to a further medium. This is, for example, the fill level of a liquid medium in a container, which otherwise contains a gaseous medium.

Thermal properties of flowing media change according to the flow speed, and so the flow of flowing media is easy to monitor.

The device for detecting the state of aggregation can therefore be, for example, a device for detecting ice in water or as the water. As is known, water and ice have different thermal properties, which can be utilized for performing detection with the aid of the device.

The thermal properties of a binary system can change when the concentration changes, according to the thermal properties of the substances, which can be ascertained with the aid of the device for detecting a medium. Therefore, the concentration of the substances of the binary system can be monitored.

The invention claimed is:

1. A device for detecting media, comprising:
a heating sensor, the heating sensor comprising a heating device and at least one first p-n junction operated in a forward direction; and
a reference sensor, the reference sensor comprising at least one second p-n junction operated in a forward direction,
wherein the heating sensor and the reference sensor are spaced apart from one another,
wherein the heating device, the at least one first p-n junction, and the at least one second p-n junction are connected to a control device, wherein the control device is operable to ascertain a presence or at least one property of a medium based at least in part on one or more thermal properties of the medium,
wherein the one or more thermal properties of the medium are determined by a difference of forward voltages from the heating sensor and the reference sensor,
wherein the forward voltages depend on a type of the medium, and
wherein the heating sensor and the reference sensor are configured relative to one another such that, when extended into the medium, ambient temperatures of the medium surrounding the device are excluded from a measurement result associated with the forward voltages or the difference of the forward voltages.

2. The device as claimed in claim 1, wherein the control device is operable to ascertain the difference of the forward voltages of the at least one first p-n junction and the at least one second p-n junction between the medium heated by the heating sensor and an unheated medium at the reference sensor.

3. The device as claimed in claim 1, wherein the heating device is at least one resistor or a p-n junction.

4. The device as claimed in claim 1, wherein the first p-n junction is a diode or a base-emitter path of a transistor.

5. The device as claimed in claim 1, wherein the at least one first p-n junction and the at least one second p-n junction are each connected to an input of a differential amplifier and an output of the differential amplifier is connected to the control device.

6. The device as claimed in claim 1, wherein the heating sensor and the reference sensor each comprise multiple p-n junctions connected in series and spaced apart from one another.

7. The device as claimed in claim 1, wherein the at least one first p-n junction and the at least one second p-n junction are connected to an electrical network via a DC-DC converter, wherein the DC-DC converter comprises at least one constant current source.

8. The device as claimed in claim 1, wherein the heating sensor and the reference sensor are finger-like.

9. The device as claimed in claim 1, wherein the at least one first p-n junction and the heating device are located on a first leg of a component carrier and the at least one second p-n junction is located on a second leg of the component carrier, the component carrier having a U-shape.

10. The device as claimed in claim 3, wherein the first leg and the second leg are located in a housing.

11. The device as claimed in claim 1, wherein the device comprises a DC-DC converter in connection with a data processing system as the control device.

12. The device as claimed in claim 1, wherein the device is a device for detecting a fill level of the medium in a container.

13. The device as claimed in claim 1, wherein the device is a device for detecting a flow of the medium.

14. The device as claimed in claim 1, wherein the device is a device for detecting a state of aggregation of the medium.

15. The device as claimed in claim 1, wherein the device is a device for detecting a concentration of a substance as the medium in a binary system.

16. The device as claimed in claim 1, wherein the device is a device for detecting an oil level in a transmission.

\* \* \* \* \*